LOW NOISE PARAMETRIC SYSTEM

Filed July 29, 1966 2 Sheets-Sheet 1

United States Patent Office 3,341,783
Patented Sept. 12, 1967

3,341,783
LOW NOISE PARAMETRIC SYSTEM

David J. Roulston, Paris, France, assignor to CSF—Compagnie Generale de Telegraphie sans Fil, a corporation of France Filed July 29, 1966, Ser. No. 568,909
Claims priority, application France, Aug. 5, 1965, 27,345, Patent 1,452,894
2 Claims. (Cl. 330—4.5)

ABSTRACT OF THE DISCLOSURE

In order to improve the signal-to-noise ratio, a parametric amplifier circuit comprises a first parametric amplifier, receiving a pumping frequency $F_p$ and a signal frequency $f_1$ with $f_1 \ll F_p$, combined with a degenerate amplifier and a frequency doubler. The degenerate amplifier has as pumping frequency the frequency $2F_p$ and for signal frequency $F \pm f_1$ The present invention relates to parametric amplifiers.

More particularly it is an object of the invention to provide a parametric amplifier system having a particularly favourable signal-to-noise ratio.

According to the invention there is provided an amplifier system, comprising a parametric amplifier, for example of the up-converter type, having a first input for receiving a signal at a first freqeuncy $f_1$ and a second input for receiving a pump frequency power and through which the output signal is collected; a circulator having a first, a second and a third port, a pump generator having an output for delivering a signal at a pump frequency $F_p$, with $F_p$ large with respect to $f_1$, connected to said first port; said second port of said circulator being coupled to said second input of said amplifier; mixing means having a first input coupled to said third port and a second input; said mixer having an output and means for applying a local oscillator signal to said second input of said mixer.

For a better understanding of the invention and to show how the same may be carried into effect reference will be made to the drawing accompanying the following description and in which, FIG. 1 is a general diagram of a circuit according to the invention;

Figure 1:
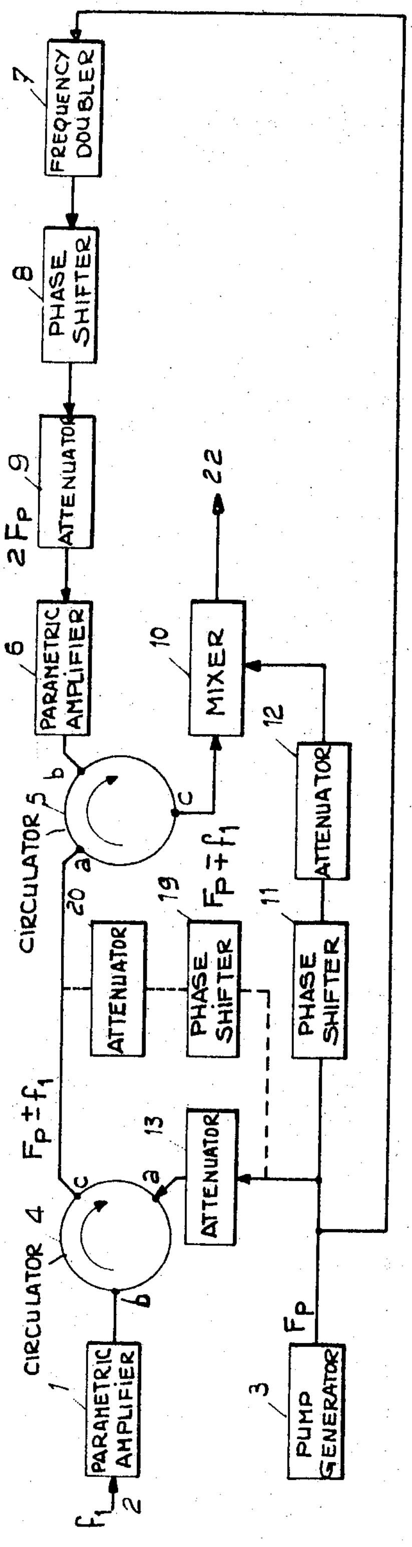

A first parametric amplifier 1 receives at its input a signal 2, at a frequency $f_1$. The pump signal from a generator 3 at a frequency $F_p$ reaches the amplifier 1 through a variable attenuator 13 and a conventional circulator 4. The arrow shows the direction in which the attenuation is low. The letters *a*, *b*, *c* designate the three ports of the circulator.

The pump signal is applied to a port *a* and amplifier 1 is coupled to port *b*. The amplifier 1 is so adjusted that the whole of the power arriving at terminal *a* is absorbed by the diode of the amplifier 1, which is an important characteristic of the invention. Under these conditions practically no power is present at frequency $F_p$ at the port *c* of the circulator 4. The output signal from the amplifier 1 appears at two frequencies $F_p+f_1$ and $F_p-f_1$, and is applied to port *b* of the circulator 4 and leaves this circulator through terminal *c*. Under these conditions it is possible to use a degenerate parametric amplifier, i.e. an amplifier which is pumped at a frequency $2F_p$ and provides amplification in two bands situated on either side of frequency $F_p$. One finds in particular at the output of the amplifier the signals $F_p-f_1$ and $F_p+f_1$. If the phase of the pump for the degenerate parametric amplifier is correct, with respect to that of the amplifier, conditions can be obtained such that the signal at frequency $F_p-f_1$ after conversion is in phase with the signal at frequency $F_p+f_1$. This improves the signal-to-noise ratio (+6 db with respect to the case where there is only a single signal at $F_p+f_1$).

To achieve this result, a second circulator 5 is provided, whose port *a* is connected to the port *c* of the first circulator 4. Terminal *b* of the second circulator 5 is connected to the degenerate amplifier 6 which is pumped by means of a pump 3, whose frequency is doubled in a doubler 7, through a variable phase shifter 8 and a variable attenuator 9. The frequency doubler 7 may be of the varactor type.

After amplification, the signals at frequencies $F_p-f_1$ and $F_p+f_1$ leave through the terminal *c*, which is connected to a conventional mixer 10, whose other input is coupled to the pump generator 3 through a variable phase shifter 11 and the variable attenuator 12. The signal at the output of mixer 22 is at frequency $f_1$.

One may insert between the pump generator 3 and the terminal *c* of circulator 4, a circuit shown in dotted line loosely coupled to port *c* and which includes a phase adjuster 19 and an attenuator 20. By this arrangement it is possible to cancel out completely any residual energy at frequency $F_p$ which might be present at terminal *c* of circulator 4 if the latter circulator is not perfect, i.e. if it allows some power to pass from terminal *a* to terminal *c*.

It is also possible to substitute the 3-terminal circulator or circulators by 4-terminal circulators (not shown), the fourth terminal *d*, situated between terminals *a* and *c*, being connected to a resistance equal to the characteristic impedance of the lines and of the circulators used.

Figure 2:
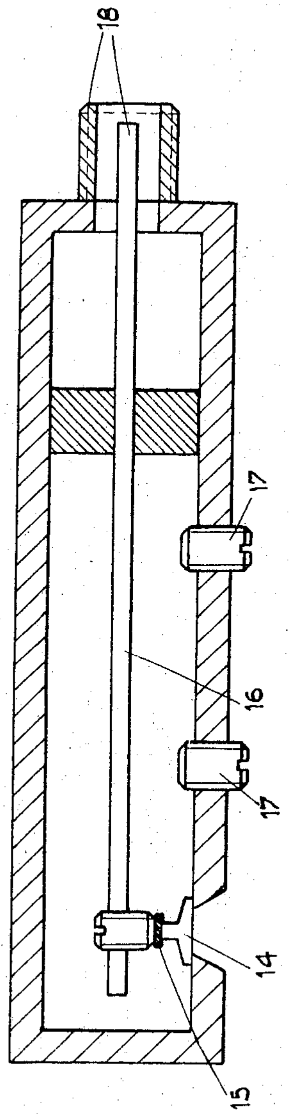
FIG. 2 shows the mechanical structure of the parametric amplifier.

The principal structural details of the amplifier 1, when used as a photo-parametric amplifier, are shown in FIG. 2. A photo diode 14 is coupled to a microstrip or coaxial line 16 by a capacity 15. The signal is applied to the photo diode by means of a light beam amplitude modulated at the signal frequency. The losses in the line have to be very small. Line 16 is matched by means of screws 17 which introduce reactances. The output point 18 is connected to the circulator as described above.

The advantage of the system according to the invention is in the fact that the whole of the power supplied by the pump can be absorbed by the diode, if the circuit shown in FIG. 2 is so adjusted that the equivalent resistance presented to the circulator at frequency $F_p$ by the diode and by the circuit is equal to the characteristic impedance of the circulator. There results that, at the terminal *c* of circulator 4, there is practically no energy issuing from the pump, which avoids possible saturation of the stages that follow.

In order to optimize the operation of the arrangement according to the invention, it is essential that the passband of circuit 1, shown in FIG. 2, be at least equal to $\pm f_1$ about frequency $F_p$. This implies that frequency $F_p$ has to be chosen sufficiently high to ensure that the passband of circuit 1 is wide enough to satisfy the intended utilisation. It is recalled that this bandwidth is determined by the diode impedance, by the impedance of the matching line and by the positions of the reactances used for matching. Under these conditions, and with the adjustments described above, the power at frequencies $F_p+f_1$ and $F_p-f_1$ would be an optimum in the load at terminal *c* of circulator 4.

By way of a non restrictive example, a few values are given corresponding to an arrangement according to the invention:

| | |
|---|---|
| Signal frequency of modulated light, $f_1$, mc./s. | From 0.5 to 1.5 |
| Pump frequency, $f_p$ (mc./s.) | 1.300 |
| Capacity of diode **14**, at —6 v., pf. | 1 |
| Coupling capacity **15**, pf. | 1 |
| Power available from pump generator, mw. | 30 |
| Power consumed by amplifier **1**, mw. | 15 |
| Power consumed by doubler **7** and amplifier **6**, mw. | 10 |
| Power consumed by the mixer, mw. | 5 |
| Gain of degenerate parametric amplifier, db | 16 |
| Noise temperature of mixer plus intermediate frequency amplifier, ° K. | 1500 |

With a good diode in amplifier 6, it is possible to obtain an equivalent noise temperature of 150° K., at the output of amplifier 1, which would ensure at the output of the system a signal-to-noise ratio of about 20 db for a fully modulated signal current of $3\times10^{-10}$ amp. at a frequency of 1 mc./s., at the input of amplifier. When this current is generated by a luminous signal, the diode being a photoparametric diode, a figure of merit, F will be obtained about $10^{-2}$, the figure of merit being defined as follows:

$$F=\frac{\text{Sensitivity of an ideal quantum detector}}{\text{Sensitivity of a detector according to the invention}}$$

the sensitivity being defined as the minimum detectable power for a signal-to-noise ratio equal to unity at the system output.

Figure 3:
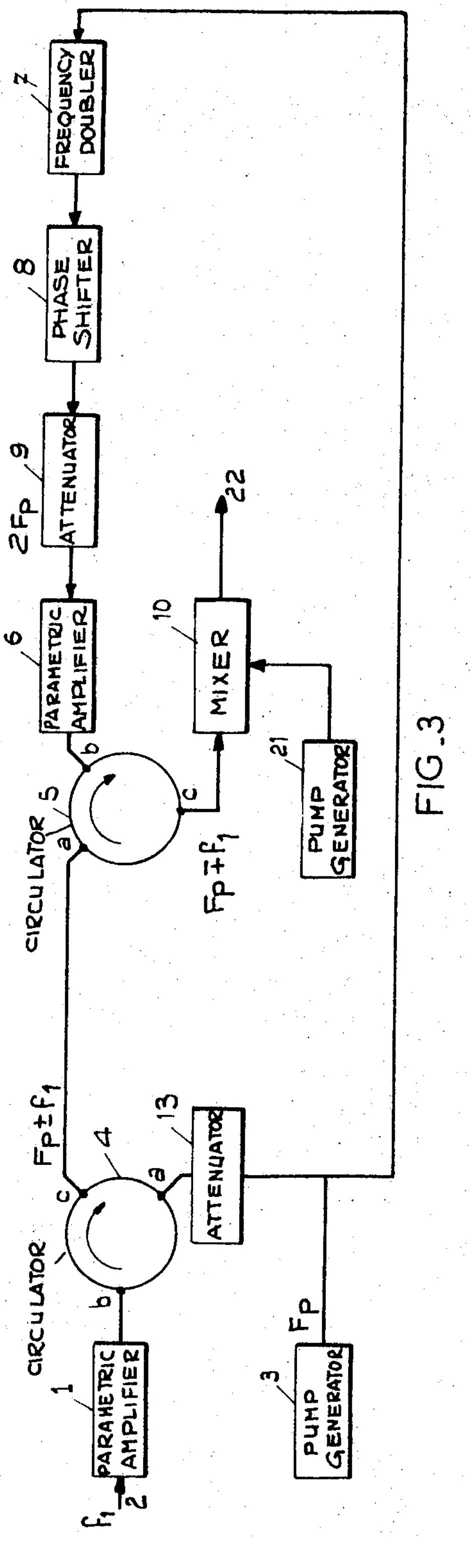
FIG. 3 shows a modification of the invention in which the output frequency may differ from the input frequency.

A first modification of the inevntion is shown schematically in FIG. 3, where like elements bear like numbers as in FIG. 1.

The local oscillator 21 is independent, so that its output frequency may have any value. This system is particularly useful if, for example, the mixer 10 has a high level noise at the frequency $f_1$. It is then advantageous to select an intermediate frequency higher than this frequency.

Figure 4:
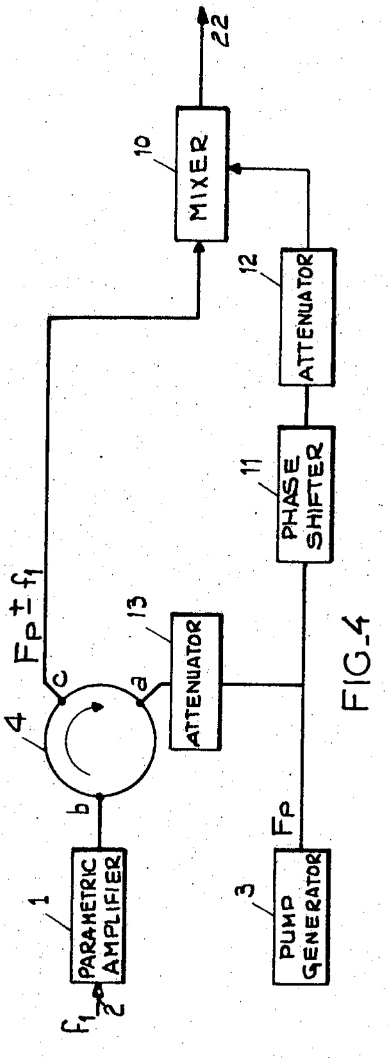
FIG. 4 shows an arrangement according to the invention in which no degenerate parametric amplifier is used.

A simplified modification is shown in FIG. 4. The circuit of this figure comprises no circulator 5 and all the circuit associated with the latter has been cancelled. The terminal *c* of the circulator 4 is directly connected to the mixer. In the circuit of FIG. 4 the output frequency is equal to frequency $f_1$. If the two signals $F_p+f_1$ and $F_p-f_1$ are applied to the mixer with a suitable phase, the amplitudes of the two signals add to the mixer output.

Of course the invention is not limited to the embodiments described and shown which were given solely by way of example.

What is claimed is:

1. An amplifier system, comprising a parametric amplifier, for example of the up-converter type, having a first input for receiving a signal at a first frequency $f_1$ and a second input for receiving a pump frequency power and through which the output signal is collected; a circulator having a first, a second and a third port; a pump generator having an output for delivering a signal at a pump frequency $F_p$, with $F_p$ large with respect to $f_1$, connected to said first port; said second port of said circulator being coupled to said second input of said amplifier; a mixer having a first input, a second input and an output; means for applying a local oscillator signal to said second input of said mixer; a second circulator having a fourth port connected to said third port, a fifth and a sixth port, a degenerate amplifier having a first input for receiving a pump frequency at a frequency $2F_p$, a second input connected to said fifth port, said first input of said mixer being coupled to said sixth port, a frequency doubler, phase shifting means and attenuating means being connected in series between said second input of said degenerate amplifier and said pump generator.

2. A system as claimed in claim 1 wherein said local signal is provided by said pumping generator, attenuator and phase shifting means being connected in series between said second input of said mixer and said pumping generator.

References Cited

UNITED STATES PATENTS

| | | | |
|---|---|---|---|
| 3,045,189 | 7/1962 | Engelbrecht | 307—88.3 |
| 3,118,113 | 1/1964 | Ferrar et al. | 330—4.5 |
| 3,237,017 | 2/1966 | Maurer et al. | 330—4.5 |
| 3,280,336 | 10/1966 | Roulston | 307—88.3 |

FOREIGN PATENTS

| | | |
|---|---|---|
| 1,313,737 | 11/1962 | France. |

ROY LAKE, *Primary Examiner.*

DARWIN R. HOSTETTER, *Examiner.*